United States Patent [19]

Yoshida et al.

[11] Patent Number: 4,749,862

[45] Date of Patent: Jun. 7, 1988

[54] SCANNING FIRE-MONITORING SYSTEM

[75] Inventors: Yoshiyuki Yoshida; Kazutaka Onozuka, both of Tokyo; Yoshihiko Ohashi, Fujisawa; Toshihide Tsuji, Sagamihara, all of Japan

[73] Assignees: Kabushiki Kaisha, Osaka; Hochiki Corp., Tokyo, both of Japan

[21] Appl. No.: 854,932

[22] Filed: Apr. 23, 1986

[51] Int. Cl.⁴ .................................................. G01J 1/00

[52] U.S. Cl. ...................................... 250/342; 250/347

[58] Field of Search ............... 250/338, 339, 342, 334, 250/347; 364/516, 517

[56] References Cited

U.S. PATENT DOCUMENTS

| | | | |
|---|---|---|---|
| 3,862,423 | 1/1975 | Kutas et al. | 250/347 |
| 4,094,225 | 6/1978 | Greenwood | 250/342 |
| 4,221,966 | 9/1980 | Kerr et al. | 250/342 |

*Primary Examiner*—Janice A. Howell

*Attorney, Agent, or Firm*—Lackenbach Siegel Marzullo & Aronson

[57] ABSTRACT

A scanning fire-monitoring system comprising a fire source detecting apparatus including a detecting head having a small field of vision and adapted to detect heat radiant energy from a monitoring area, a vertical scanning drive means for letting the detecting head scan within a detection range of small width on the monitoring area, and a horizontal scanning drive means for mounting said detecting head and said vertical scanning drive means thereon and rotatable in a horizontal direction and an arithmetic unit for carrying out a required signal processing and decision on the basis of a detection signal from the detecting head said detecting head being driven in vertical and horizontal directions to scan over the entire monitoring area.

19 Claims, 10 Drawing Sheets

SCANNING FIRE-MONITORING SYSTEM

FIELD OF THE INVENTION AND RELATED ARTS

This invention relates to a scanning fire-monitoring system which monitors fire over a wide area of a huge-space structure such as a large-scale pavilion, a domed baseball grounds by using an one-dimensional scanning heat radiation detector for detecting heat radiant energy from a monitoring area.

Recently, huge-space structures have been constructed throughout the world. Many of these huge-space structures are used not only as grounds for baseball, soccer, American football, etc., but for various uses such as exhibition, meeting or concert.

These huge-space structures include an air dome, a steel-frame dome, etc. In any type of structure, fire monitoring within the structure is very difficult with a conventional fire monitoring technique because of its great space and height. Especially, in an air dome structure in which a dome having a membrane ceiling structure so-called an air dome formed by utilizing a difference in atmospheric pressures between the inside and the outside of the structure, fire monitoring is difficult because of its tremendous space, or even installation of lines or fire detectors is quite difficult as the case may be.

For example, when a conventional spot-type heat sensor or smoke detector is employed, it should be fixed in the vicinity of the ceiling, but the fixing position is too high for heat or smoke caused at an early stage of a fire to reach the sensor or detector. As the heat sensor or smoke detector can only detect the presence of hot air current or smoke, it is not possible to locate a fire source even if a number of sensors or detectors are installed.

On the other hand, a visual monitoring apparatus such as a TV camera or thermovision which monitors a part of the monitoring region in a two-dimensional form by using optical elements is used to detect a change in a visual image. However, this type of apparatus involves such a problem that movement of people or movement of light etc. may possibly cause erroneous fire detection. There has been developed another type of apparatus which detects a fire upon receipt of infrared radiation or ultraviolet radiation. However, this type of apparatus is not suitable for fire detection in a huge space because the detectable distance by the detecting element commercially available at present is as short as 20 or 30 m. This type of apparatus has another problem that it only detects a fire in the two-dimensional form and it is not possible to specify or locate a fire source.

Thus, accurate fire detection can not be expected with conventional detecting means when they are used in a huge-space structure.

In Hoosier Dome recently built in Indiana, U.S.A., there is employed a fire detection system which is formed of separate type laser smoke detectors and separate type photo smoke detectors disposed all over the space.

More particularly, this Hoosier Dome has a rectangular shape in section and it employs laser detectors for monitoring of a longer side and photo detectors for monitoring of a shorter side. Thus, monitoring lines intersect each other like a matrix in a spacious monitoring region to detect not only a fire but a position of a fire source.

This system, however, has a problem that it needs a laser detectors having a long reach. For example, laser detectors having a maximum effective reach of 183 m are employed for monitoring of the longer side in Hoosier Dome. Further, according to this system, the detection of the fire source position is based on such assumption that smoke ascends straightly above the fire source. Therefore, the influence of an air current within the dome upon smoke stream should be considered. In addition, a tremendous number of detectors are needed to cover the entire space to be monitored like a matrix. This makes the entire system complicated.

This system further involves a technical problem that ghost is generated due to the matrix monitoring system. For example, if it is assumed that two fire sources are present at the same time, there are four monitoring lines, two in the length and two in the transversal, to connect the fire sources and the detectors and there are formed four intersections. It is determined, in matrix monitoring, that fire sources are located at intersections of the monitoring lines when the detectors in two directions detect fire sources. Therefore, in the case as mentioned above, it is determined that a fire source is present on every intersection. However, actual fire sources are present only at two intersections. The remaining two intersections are mere crossing points of monitoring lines and fire sources are not present there. The latter two intersections generate "ghosts" which may possibly be erroneously taken as fire sources. Thus, the system still has a problem to be solved technically.

Furthermore, in the matrix monitoring, when the monitoring lines are intercepted, for example, by movement of people, the detection is obstructed. Thus, the positions of the stands, nets against a ball, etc. should be carefully selected so as not to interfere the desired detection.

OBJECTS AND SUMMARY OF THE INVENTION

It is an object of the present invention to provide a scanning fire-monitoring system which is capable of solving the problems involved in the conventional techniques.

The scanning fire-monitoring system of the present invention is characterized by a fire source detecting apparatus including a detecting head having a small field of vision and adapted to detect heat radiant energy from a monitoring area, a vertical scanning drive means for letting the detecting head scan within a detection range of small width in the monitoring area, and a horizontal scanning drive means for mounting said detecting head and said vertical scanning drive means thereon and rotatable in a horizontal direction and by an arithmetic unit for carrying out a required signal processing and decision on the basis of a detection signal from the detecting head, said detecting head being driven in vertical and horizontal directions to scan the entire monitoring area.

DESCRIPTION OF THE PREFERRED EMBODIMENTS

Figure 1:
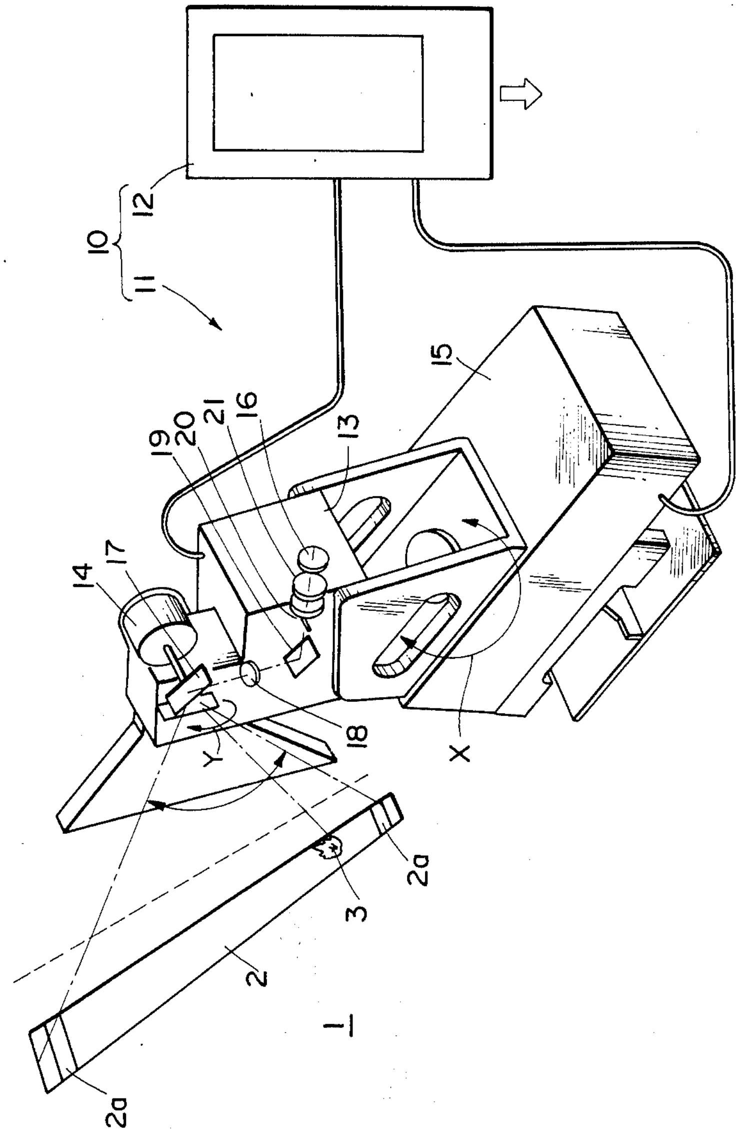
FIG. 1 is a perspective view of a first embodiment of the present invention.

Preferred embodiments of the present invention will now be described.

A scanning fire-monitoring system 10 according to the present invention is comprised of a fire source detecting apparatus 11 and an arithmetic unit 12.

The fire source detecting apparatus 11 comprises a detecting head 13, a motor 14 functioning as a vertical scanning drive means and a turning table 15 functioning as a horizontal scanning drive means. The detecting head 13 and the motor 14 are mounted on the turning table 15.

The detecting head 13 is comprised of a detecting element 16 and an optical system 22 including a rotatable mirror 17, an objective lens 18, a reflector 19, a slit 20 and a condenser lens 21.

The detecting element 16 may be widely selected from commercially available heat radiation pyrometer. These pyrometers include a thermoelectric wide-band radiation-pyrometer (such as pyroelectric element), a photoelectric narrow-band radiation-pyrometer (such as a photoelectric tube, an electron-multiplier phtotube, PbS, PbSe, InSb, or HgCdTe). Among these, PbSe is most preferred for fire detection in a huge-space structure when the characteristics of wavelength or factors of obstacles against monitoring are taken into consideration. This PbSe is preferably thermoelectronically cooled to 0° to −20° C. In this case, the response time is suitable and the S/N ratio is improved.

The optical system 22 is not limited to the combination as illustrated and it may be any known apparatus or system which can effect optical condensation. In this connection, it is to be noted that the objective lens 18 and the condenser lens 21 simply represent lens systems and they may be a single lens or a composite lens.

Figure 2:
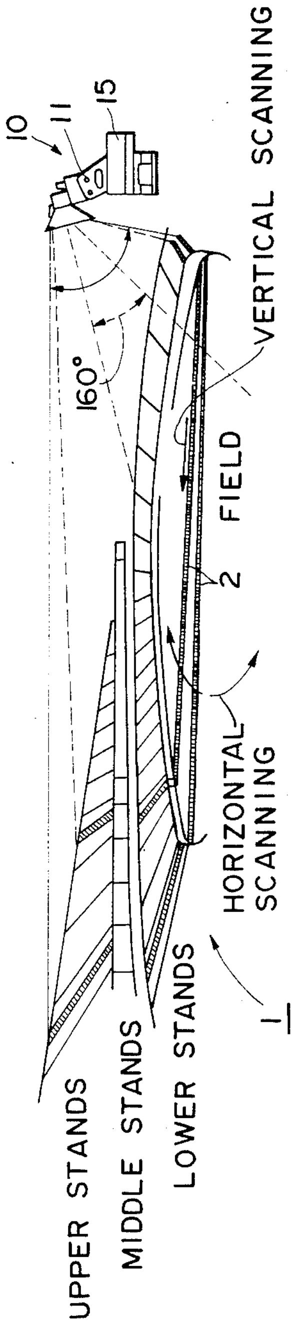
FIG. 2 is an explanatory view showing the fire monitoring in a huge space wherein the embodiment of FIG. 1 is employed.

The slit 20 of the optical system 22 defines an instantaneous field of view 2a and functions as a stop for the condenser lens 21. The instantaneous field of view 2a is as small as, for example, about 1° in the horizontal direction and about 0.5° in the vertical direction. Therefore, the detection range 2 is in the elongated strip-like form. With the angles of the instantaneous field of view 2a as given above, the width of about 3.5 m and the height of about 1.5 m can be covered at a position 200 m ahead so that the monitoring may be carried out with such a field of view around upper stands as illustrated in FIG. 2.

The rotatable mirror 17 is fitted to a rotating shaft of the motor 14 and rotated at a given rate in a direction indicated by an arrow Y. The rotatable mirror 17 scans the detection range 2 of a region 1 to be monitored in the vertical direction according to the rotation by the motor 14 and continuously gives an optical image in the instantaneous field of view 2a . . . to the detecting element 16 through the objective lens 18, the reflector 19, the slit 20 and the condenser lens 21.

The rotatable mirror 17 is a double-sided mirror and rotates to scan the detection range 2 upwardly with a given period, so that each of the instantaneous fields of vision 2a is monitored twice upon every rotation of the rotatable mirror 17.

The turning table 15 has the detecting head 13 and the motor 14 mounted thereon as described before and reciprocates horizontally in a direction as indicated by an arrow X in FIG. 1, thereby to make the detecting head 13 scan a predetermined monitoring region horizontally. For this purpose, the turning table 15 has a motor, a rotary unit, etc. therein.

More specifically, the fire monitoring system of the present invention is adapted to make linear scanning (one-dimensional scanning) and the embodiment as illustrated adopts object-space scanning method. The reason will be described hereinafter.

Scanning is in general classified into a linear scanning (one-dimensional scanning) and an areal scanning (two-dimensional scanning). The angle of the field of vision for detection required in the huge-space structure is as wide as, for example, 80° in the vertical direction and 160° in the horizontal direction as illustrated in FIG. 2. On the other hand, the scanning methods employing optical systems are classified into object-space scanning which makes scanning before a condensing system and an image-space scanning which makes scanning after the condensing system. The object-space scanning can provide a larger scanning angle and provides less image distortion because it can maintain the optical axis in parallel with the condenser. However, the object-space scanning has such a disadvantage that the scanning mechanism therefor should be bulky. Whereas, the image-space scanning can be structured compact, but this image-space scanning is disadvantageous in that the scanning angle is limited and the image distortion is significant.

Thus, it is almost impossible for the image-space scanning to satisfy the required angles of field of vision for detection both in the horizontal and vertical directions. In the case of the object-space scanning, however, the angle of field of vision in the horizontal direction is too wide. The present invention has solved these problems by employing the detecting head having an elongated field of vision for detection and rotating the detecting head horizontally.

With this arrangement, the scanning fire-monitoring system of the present invention can cover wide entire area to be monitored by combining the vertical scanning by the detecting head 13 effected by the motor 14 and the horizontal scanning by the detecting head 13 by the turning table 15.

Figure 3:
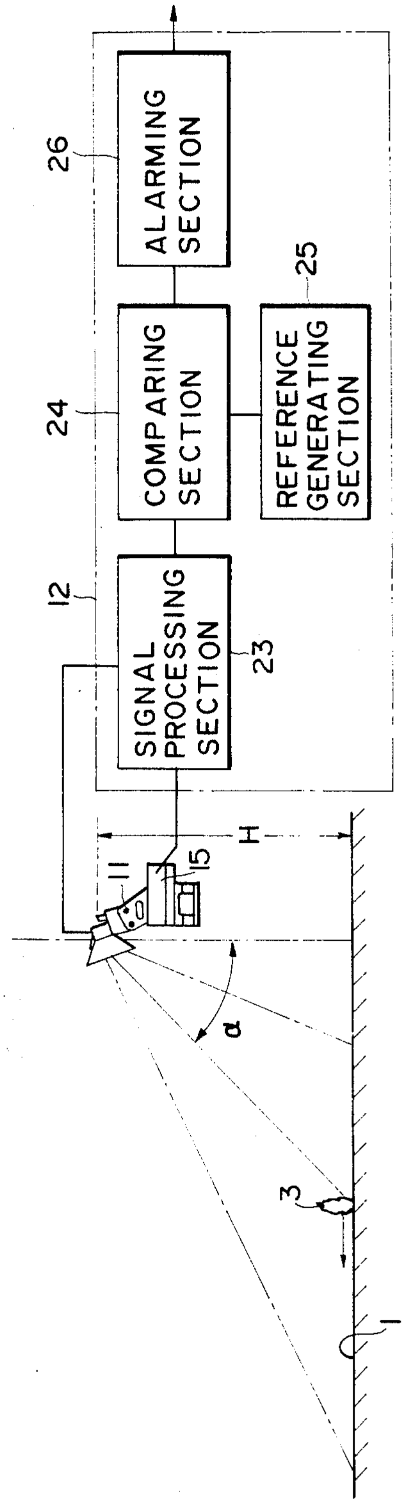
FIG. 3 is an explanatory view showing an arithmetic unit of FIG. 1 in the form of a block diagram and scanning angles in a vertical direction.
Figure 4:
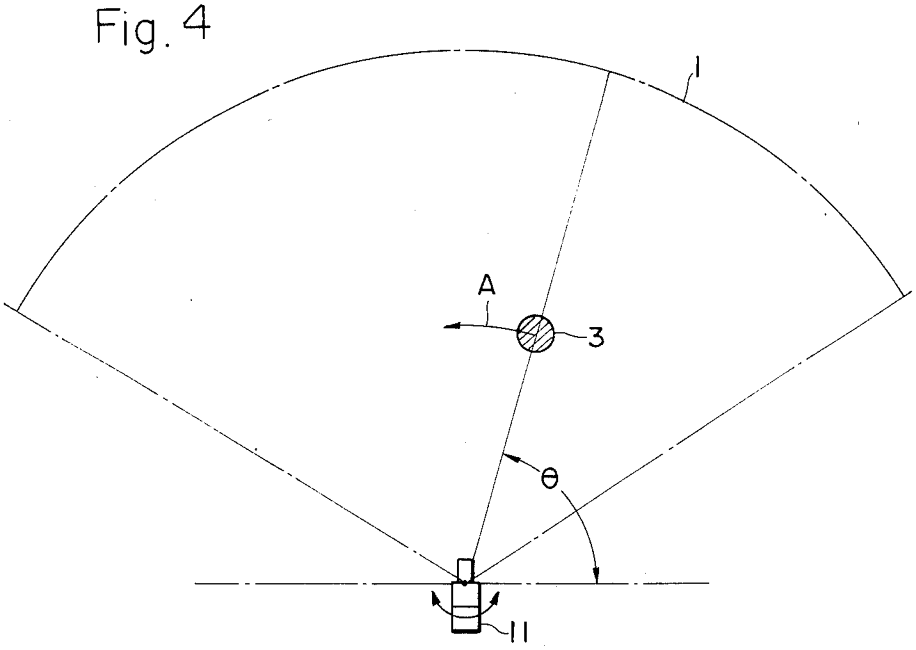
FIG. 4 is an explanatory view showing scanning angles in a horizontal direction.

An output from the detecting element 16 is input to the arithmetic unit 12 as a signal representing a heat radiant energy from a fire source. A rotational angle $\theta$ of the turning table 15 around a horizontal axis and a rotational angle $\alpha$ of the rotatable mirror 17 in a vertical direction (see FIGS. 3 and 4) are also input to the arithmetic unit 12 as positional data for fire-source detection.

The arithmetic unit 12 includes a signal processing section 23, a comparing section 24, a reference generating section 25 and an alarming section 26. The detection signal from the detecting element 16, a detection signal representing the vertical scanning angle $\alpha$ of the rotatable mirror 17 and a detection signal representing the horizontal rotation angle $\theta$ of the turning table 15 are input to the signal processing section 23 and processed there by instantaneous fields of view *2a* . . . so as to be output to the comparing section 24. The comparing section 24 is supplied with a reference value for detection of a fire from the reference generating section 25 to compare the measured detection values of the respective positions output from the signal processing section 23 with the reference value. If the measured value exceeds the reference value, it is determined as a fire and a fire alarm signal is output from the alarming section 26 to a central processing unit.

At this time, the position of a fire source 3 can be determined from the rotational angles $\alpha$ and $\theta$. Further, a distance R to the fire source 3 from the fire-source detecting apparatus 11 can be calculated on the basis of the vertical scanning angle $\alpha$ when the fire source 3 has been detected. Since a height H of the fire-source detecting apparatus 11 from a surface 13 to be monitored is known, the distance R can be obtained by:

$$R = H\tan\alpha \qquad (1)$$

If the position and the distance of the fire source are thus known, fire extinguishing, for example, water application can be readily carried out.

Figure 5:
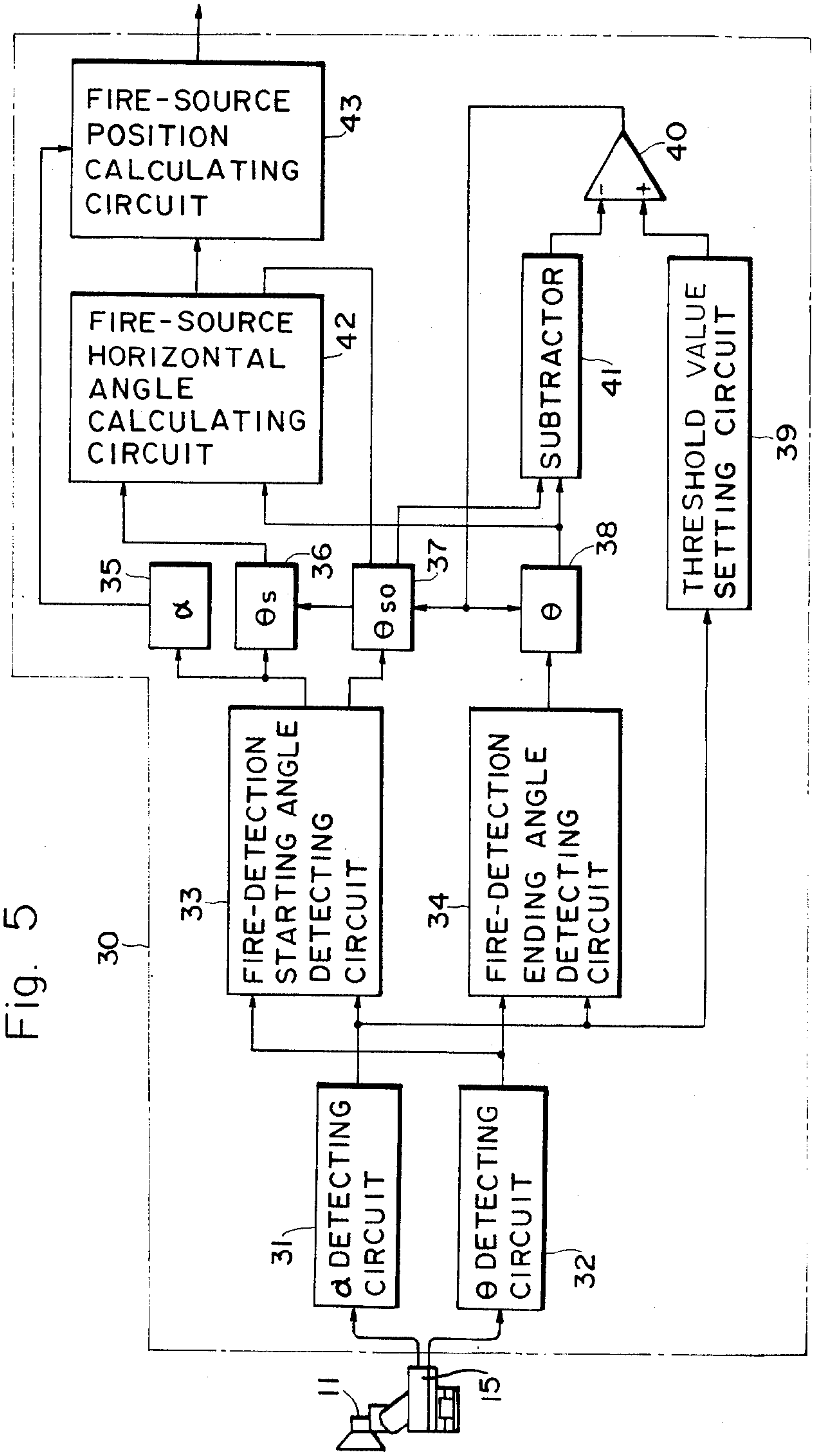
FIG. 5 is a block diagram of a second embodiment of the present invention.

FIG. 5 illustrates a second embodiment of the present invention. In this embodiment, a fire-source detecting apparatus 11 is substantially the same as that of the foregoing embodiment, but an arithmetic unit 30 differs from the unit 12 of the first embodiment.

The arithmetic unit 30 carries out detection of the position of a fire source 3 and determination of the fire source positions when there are a plurality of fire sources 3 as shown in FIG. 5.

In the figure, 31 is an $\alpha$ detecting circuit 32 for detecting a vertical scanning angle $\alpha$ and 32 is a $\theta$ detecting circuit for detecting a horizontal scanning angle $\theta$. Outputs from the respective detecting circuits 31 and 32 are input to a circuit 33 for detecting a fire-detection initiating angle and a circuit 34 for detecting a fire-detection terminating angle.

The circuit 33 for detecting the fire-detection initiating angle provides a horizontal scanning angle $\theta$ when a fire detection signal, i.e., a vertical scanning angle signal is first obtained during ordinary monitoring to a register 36 to store the same as a fire-detection initiating angle $\theta$s and provides said vertical scanning angle $\alpha$ to a register 36 to store the same therein. The circuit 33 further provides a fire-detection initiating angle $\theta$ when another fire source is detected after detection of the first fire-detection initiating angle $\theta$s to a register 37 to store the same as a second fire-detection initiating angle $\theta$so.

On the other hand, the circuit 34 for detecting the fire-detection terminating angle detects a timing when the fire detection signal, i.e., the vertical scanning angle $\alpha$ signal becomes null after the registers 35 and 36 have stored the vertical scanning angle $\alpha$ and the horizontal scanning angle $\theta$ when the fire source have been first detected and provides the then horizontal scanning angle $\theta$ to a register 38 to store the same as a fire-detection terminating angle $\theta$e.

The processing of the vertical scanning angle and the horizontal scanning angle to store the same in the registers 35 to 38 by the circuit 33 for detecting the fire-detection initiating angle and the circuit 34 for detecting the fire-detection terminating angle will be described referring to FIG. 6.

Figure 6:
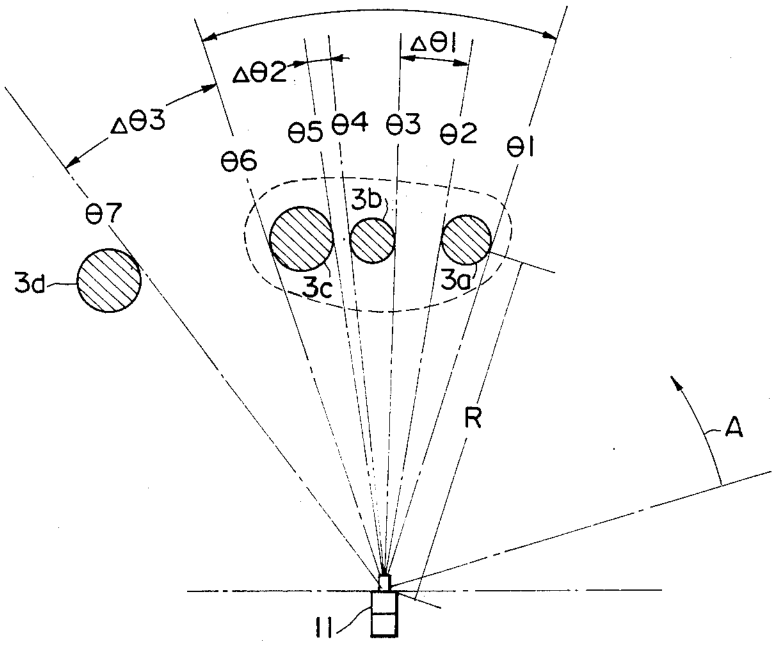
FIG. 6 is an explanatory view showing a processing for the fire source detection according to the embodiment of FIG. 5.

FIG. 6 illustrates a case where three fire sources *3a*, *3b* and *3c* are detected within the same fire range 3. Now, assuming that the horizontal scanning is carried out by the fire-source detecting apparatus 11 in a direction indicated by an arrow A, a horizontal scanning angle $\theta 1$ obtained upon detection of the first fire source *3a* is stored by the register 36 as a fire-detection initiating angle $\theta$s and at the same time, a vertical scanning angle at that time is stored by the register 35. Subsequently, when the scanning reaches a position corresponding to a horizontal scanning angle $\theta 2$ where the first fire source *3a* is out, the vertical scanning angle $\alpha$ signal becomes null so that the circuit 34 for detecting the fire-dectection terminating angle detects the fire-source ending position and the register 38 stores the horizontal scanning angle $\theta 2$ as a fire-source terminating angle $\theta$e.

Further, when the scanning reaches a starting position of the second fire source *3b*, a detection scanning angle $\alpha$ signal is again obtained, so that the circuit 33 for detecting the fire-detection initiating angle makes the register 37 store the horizontal scanning angle $\theta 3$ at that time as a second fire source initiating angle $\theta$so.

Now, referring again to FIG. 5, the output from the detecting circuit 31 is provided to a threshold value setting circuit 39 and the threshold value setting circuit 39 calculates a horizontal distance R from the position at which the fire-source detecting apparatus 11 to the fire source when a fire detection signal comprised of the vertical scanning angle $\alpha$ signal is obtained. The calculation of this distance R is made according to the formula (1) as used in Example 1.

The threshold value setting circuit 39 further calculates, on the basis of the distance R to the fire source obtained by the formula (1), a length per unit angle of a circumference having a radius of the distance R as follows:

$$2\ R/360 = \text{a length per unit angle} \qquad (2)$$

In this connection, it is to be noted that a value Lo for an interval between fire sources which is capable of regarding the fire sources as being within the same fire range is preliminarily set in the threshold value setting circuit 39. The value Lo is set, for example, as 2.5 m. When the interval between two adjacent fire sources is within the set value Lo, the fire sources are regarded as being the same fire.

Since the fire-source positions are stored as horizontal scanning angles $\theta$ in the registers 35 to 38, respectively, the set interval Lo is converted into an angle and compared by a comparator 40.

More particularly, since the length per unit angle of the circumference with a radius of the distance R to the fire source has been obtained by the formula (2), the set interval Lo is changed into a threshold angle θk which is a horizontal scanning angle as follows:

$$\theta k = 360 \times Lo/2\pi R \quad (3)$$

Therefore, the threshold value setting circuit 39 obtains the horizontal distance R to the fire source on the basis of the vertical scanning angle α of the fire-source detecting apparatus 11 according to the formula (1) and obtains the threshold angle θk for the set interval Lo according to the formula (3) to output to the comparator 40.

The comparator 40 is supplied with an output from a subtractor 41. The subtractor 41 obtains a difference between the fire source terminating angle θe of the first fire source and the fire source initiating angle θso of the second fire source stored by the registers 38 and 39, respectively, i.e., an angular difference Δθ1 corresponding to the interval between the fire sources *3a* and *3b* in FIG. 6. The comparator 40 compares the obtained angular difference Δθ1 with the threshold angle θk corresponding to the set interval Lo capable of regarding the fire sources as being the same fire. When the angular distance Δθ between the adjacent fire sources obtained by the subtractor 41 is smaller than the threshold angle θk, the comparator 41 generates a comparison output which indicates that the two fire sources are the same fire and cancels the fire starting angle θso of the second fire source stored in the register 37 and the fire ending angle θe stored in the register 38 to stand by for storing of further detection angles. On the other hand, when the angular difference Δθ between the adjacent fire sources is determined as a result of the comparison, as exceeding the threshold angle θk, a fire-source horizontal angle calculating circuit 43 calculates an average fire source angle $\bar{\theta}$ given as an average (θe−θs)/2 of the fire-detection starting angle θs and the fire-detection ending angle θe stored in the registers 36 and 38, respectively. The calculating circuit 43 further calculates the coordinates (X, Y) of the position of a fire source on the basis of the average fire source angle θ and the vertical scanning angle α of the fire source first detected and stored in the register 35.

When there is only one fire source, the coordinates of the position of the fire source is calculated.

When the average fire-source angle $\bar{\theta}$ is calculated by the fire-source horizontal angle calculating circuit 42, a transfer instruction is provided to the register 37 to transfer the fire-detection starting angle θso of the second fire source stored therein to the register 36. The register 36, in turn, stores the transferred fire-detection starting angle θso as a fire-detection starting angle θs for use in the following calculation.

The detection operation will now be described in detail, referring to the flowchart of FIGS. 7(A) and (B) which shows, by way of example, a detection operation when a plurality of fire sources are detected.

Figure 7A:
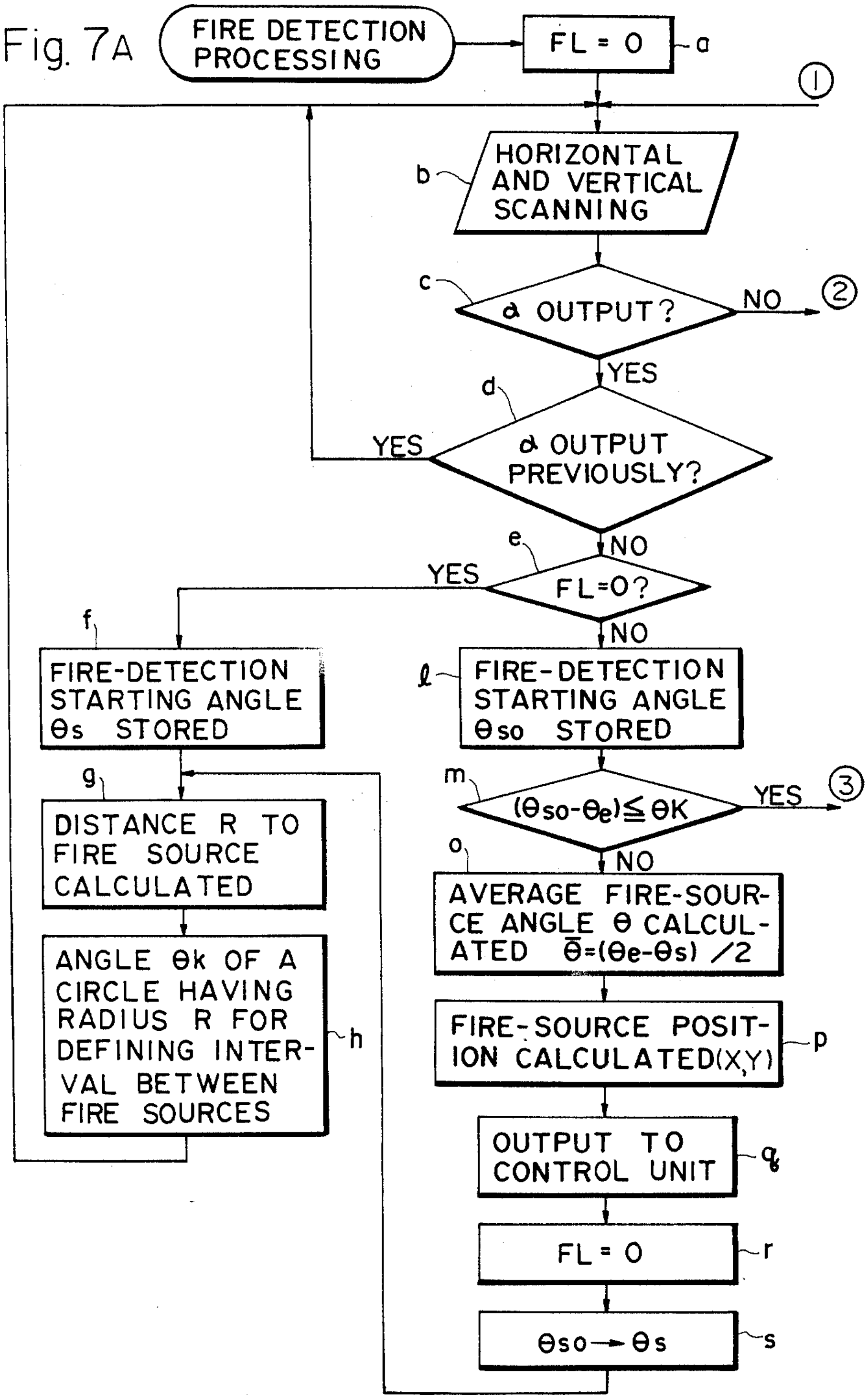
FIGS. 7(A) and (B) is a flowchart showing the processing for the fire source detection according to the embodiment of FIG. 5.
Figure 7B:
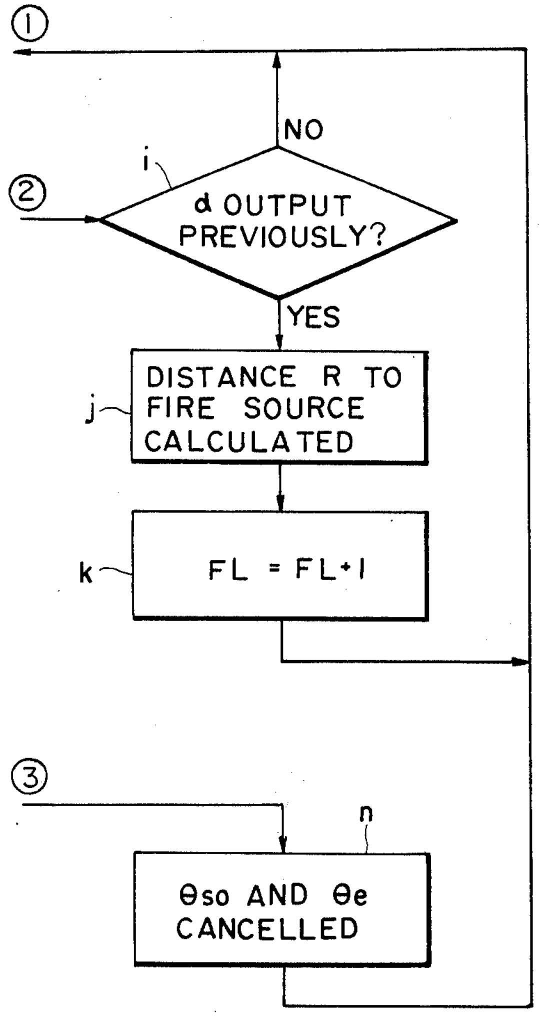

In the flowchart of FIGS. 7(A) and (B), when a power source of the system is connected, a flag counter FL is reset at block a and horizontal and vertical scanning is carried out by the fire source detecting apparatus 11 as indicated by block b. During the scanning by the fire source detecting apparatus 11, it is checked at block c if there is a fire source detection output, i.e., an output of a vertical scanning angle signal or not. When there is no α output, the horizontal and vertical scanning of block b is repeated through decision block i.

During this scanning, if the first fire source *3a* is detected at a horizontal scanning angle θ1 as illustrated in FIG. 6, the step proceeds to block d to check whether there has been α output previously. In this case, since there has been no α output previously, the step proceeds to decision block e. As the flag counter FL=0, the step proceeds to block f to store the then horizontal scanning angle θ1 as a fire-detection starting angle θs. Subsequently, a distance R to the fire source is calculated, at block g, on the basis of the vertical scanning angle α obtained by the fire source detection. Further, a threshold angle θk of a circle having a radius R for defining an interval between fire sources to be set is calculated at block h.

When the calculation of the threshold angle θk has been completed, the step again returns to block b for scanning. At this time, since the detection of the fire source *3a* is lasting, the processing operations of block b to the decision block d are repeated until the α output becomes null.

When the horizontal scanning reaches to a horizontal scanning angle θ2 where the fire source *3a* is out as illustrated in FIG. 6, the α output becomes null so that the step proceeds from decision block c to decision block i. Decision block i checks whether there has been α output previously or not and at this time, since the α output has been obtained in the previous scanning, the step proceeds to block j to store the then horizontal scanning angle θ2 as a fire-detection ending angle θe. Then, increment of the flag counter FL is carried out at block k and the step returns again to block b for scanning.

In this scanning, the processing operations of block b to decision block i are repeated until the next fire source *3b* is detected. When the next fire source *3b* is detected at a horizontal scanning angle θ3 and an α output is obtained, the step proceeds to decision block e through decision block d. Since the flag counter FL=1 at this time, the step proceeds to block 1 to store the then horizontal scanning angle θ3 as a second fire-detection starting angle θso. Then, at block m, a difference between the fire-detection ending angle θe stored at block j and the fire-detection starting angle Oos of the second fire source stored at block 1, i.e., an angular difference Δθ1 between the fire sources *3a* and *3b* is obtained and compared with the threshold angle θk calculated at block h. In this case, since the angular difference Δθ1 is smaller than the threshold angle θk, the fire sources *3a* and *3b* are regarded as the same fire and the step proceeds to block n to cancel the fire-detection starting angle θso of the second fire source and the fire-detection ending angle θe stored at blocks j and l, respectively. The step then returns to block b for further scanning.

Similar processing is carried out with respect to a third fire source *3c*. Since an angular difference Δθ2 between the fire sources *3b* and *3c* is also smaller than the threshold angle θk, the fire sources *3a, 3b* and *3c* are regarded as being the same fire.

During further horizontal scanning of the fire source detecting apparatus 11, the apparatus 11 detects another fire source *3d* in a different fire range, an angular difference Δθ3 between a fire-detection ending angle θe=θ6 of the third fire source *3c* and the fire-detection starting angle θso=θ7 of the second fire source is compared, at decision block m of the flowchart shown in FIG. 7(A) and (B), with the threshold angle θk. Since Δθ3 is larger than the threshold angle θk at this time, said fire source is regarded as a different fire and the step proceeds to block o to calculate an average fire source angle $\bar{\theta}$ of the fire range including the fire sources 3*a*, 3*b* and 3*c* regarded as being the same fire on the basis of the fire-detection starting angle $\theta s = \theta 1$ stored at block f and the fire-detection ending angle $\theta e = \theta 6$ stored at block j. Subsequently, coordinates (X, Y) of the position of the fire is calculated at block p on the basis of the average fire source angle $\bar{\theta}$ and the vertical scanning angle $\alpha$ obtained by the first fire-source detection and the coordinates of the position of the fire source is output to a control unit such as a monitor nozzle to control the direction of the nozzle at block q. After the flag counter FL is reset at block r, the fire-detection starting angle $\theta so = \theta 7$ of the second fire source stored at block 1 is substituted for the fire-detection starting angle $\theta s$ of the first fire source at block f for further fire source detection of another position. The step further proceeds to block g for calculating a distance R to the fire source on the basis of the vertical scanning angle $\alpha$ providing a fire-detection starting angle $\theta s$ of a new fire source and to block h for calculating the threshold angle $\theta k$ on the basis of the distance R to the fire source, thereby advancing to a further fire-source detection processing.

Although the average fire source angle $\bar{\theta}$ of the fire sources 3*a*, 3*b* and 3*c* regarded as being the same fire is calculated in the flowchart of FIGS. 7(A) and (B) when the new fire source 3*d* which is not within the same fire range is detected as shown in FIG. 6, the average fire source angle $\theta$ may alternatively be calculated on the basis of the end timing of one cycle of the horizontal scanning or on the timing at which the horizontal scanning exceeding the threshold angle $\theta k$ from the fire-detection ending angle is carried out when another fire source is not detected after detection of the fire source 3*d*.

Further, although the detection processing of the fire source position is carried out at a real time whenever the fire-source detection output, i.e., the vertical scanning angle $\alpha$ signal is obtained in the flowchart of FIGS. 7(A) and (B), alternatively, the horizontal scanning angle at which the fire source is first detected may be regarded as an initial position to collect detection data during one cycle of the horizontal scanning and store the same in a memory so that the fire source position may be obtained by processing the data stored in the memory. The fire-source detection processing of the present invention as shown in the flowchart of FIGS. 7(A) and (B) may be carried out without making a change by the programmed control of a microcomputer.

Further, although the set interval Lo which is a reference for regarding fire sources as being the same fire is converted into the threshold angle $\theta k$ for making determination as to whether the fire sources are the same fire or not through the comparison of the angular difference between the adjacent fire sources with the threshold angle in the second embodiment as mentioned above, the angular difference $\Delta\theta$ between the adjacent fire sources may alternatively be converted into a distance for comparison with the set distance Lo.

In this connection, it is to be noted that the second embodiment is based on the assumption that a plurality of fire sources 3*a* . . . are not so much distanced from each other in the vertical scanning direction, but the coordinates of the positions of the respective fire sources obtained may be utilized to obtain projection distances on a plane. The determination as to whether the fire sources are the same fire or not may be made on the basis of the projection distances thus obtained. In this case, more accurate fire source detection can be realized.

According to this embodiment, even when a plurality of fire source positions are detected within the same fire range due to variations of intensity of flames, it can be known that they belong to the same fire from the distribution of the fire sources 3 and the direction control of the monitor nozzle can be effected accurately, allowing the water discharge to impinge upon the center of the fire range.

Figure 8:
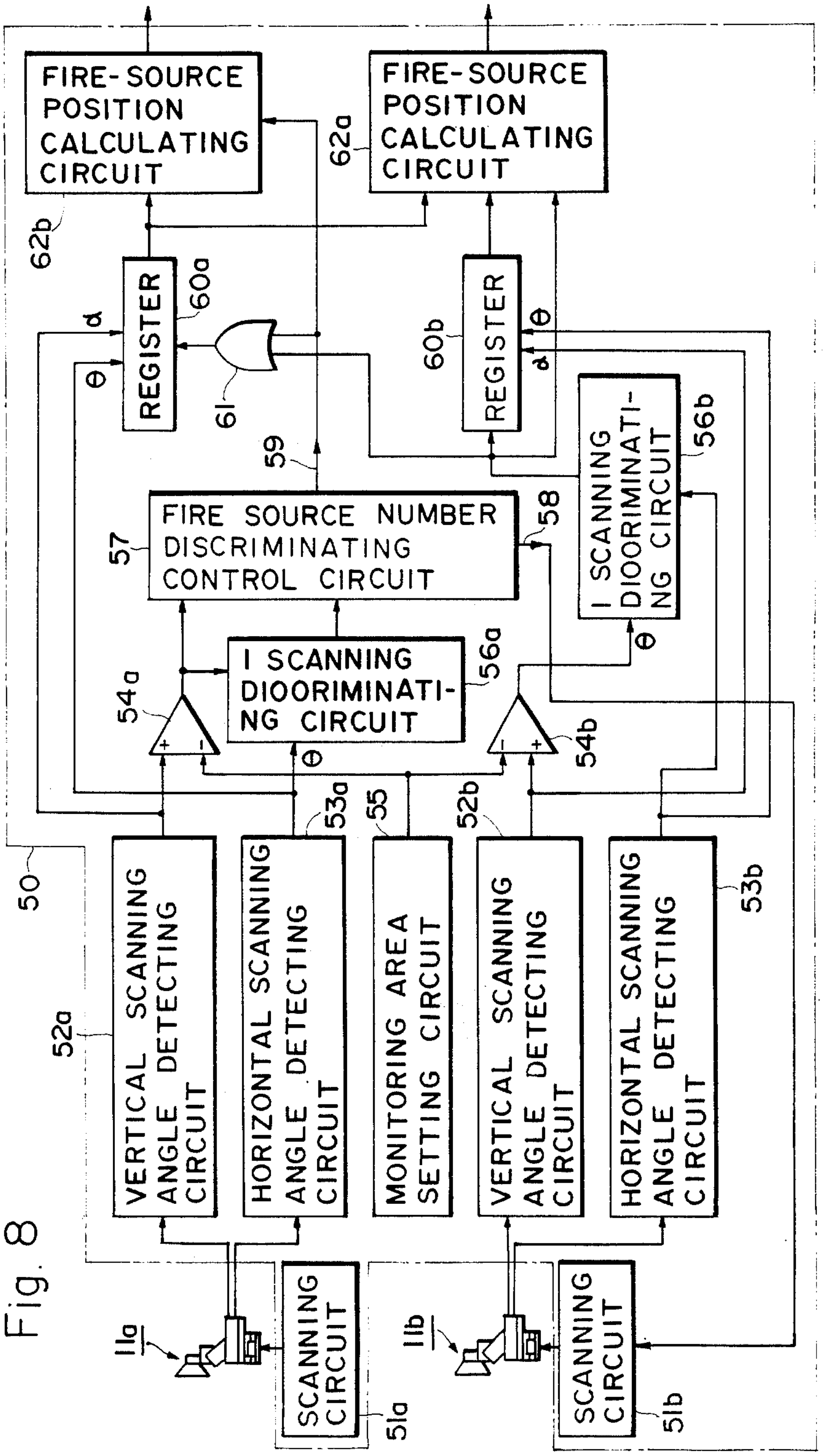
FIG. 8 is a block diagram of a third embodiment of the present invention.

FIG. 8 illustrates a third embodiment of the present invention. This embodiment is provided with two fire source detecting apparatuses 11*a*, 11*b*. Each of the fire source detecting apparatuses is identical with that of the first embodiment, but an arithmetic unit 50 differs from that of the first embodiment.

More particularly, the first and the second fire source detecting apparatus 11*a*, 11*b* have scanning circuits 51*a*, 51*b*, respectively. The first fire source detecting apparatus 11*a* is normally driven for scanning by the scanning circuit 51*a*, whereas the second fire source detecting apparatus 11*b* is normally not driven by the scanning circuit 51*b*.

Outputs from the fire source detecting apparatuses 11*a*, 11*b* are provided to vertical scanning angle detecting circuits 52*a*, 52*b* and horizontal scanning angle detecting circuit 53*a*, 53*b*, respectively. The horizontal scanning angle detecting circuits 53*a*, 53*b* output horizontal scanning angle $\theta$ signals corresponding to the horizontal scanning of the detecting apparatuses, respectively. On the other hand, the vertical scanning detecting circuits 52*a*, 52*b* outputs vertical scanning angle $\alpha$ signal only when detecting elements 16 of the fire source detecting apparatuses 11*a*, 11*b* detects a fire source 3. By this reason, the detection signals $\alpha$ from the vertical scanning angle detecting circuits 52*a*, 52*b* function as fire detection signals.

The first fire source detecting apparatus 11*a* which is normally driven for scanning will now be described.

The output from the vertical scanning angle detecting circuit 52*a* is provided to a monitoring area discriminating circuit 54*a* which is shown in the form of comparator. The monitoring area discriminating circuit 54*a* receives a set signal from a monitoring area setting circuit 55 as a reference for the discrimination and generates an output after making discrimination of only the detection vertical scanning angle $\alpha$ signal within the monitoring area. The output from the monitoring area discriminating circuit 54*a* is supplied to an one-scan discriminating circuit 56*a* and a fire source number discrimination control circuit 57.

The one-scan discriminating circuit 56*a* counts and discriminates the horizontal scanning angle $\theta$ with the timing at which the vertical scanning angle $\alpha$ signal due to firesource detection is obtained from the monitoring area discriminating circuit 54*a* regarded as a scanning reference point. The discriminating circuit 56*a* discriminates the scanning of one cycle from the timing at which the vertical scanning angle $\theta$ signal due to the firesource detection is obtained to the end of the scanning over the entire supervisory region and generates a discrimination output to the fire source number discrimination control circuit 57 when the one cycle of scanning has been completed.

The fire source number discrimination control circuit 57 counts the vertical scanning angle $\alpha$ signal, i.e., fire-source detection signal obtained through the monitoring area discriminating circuit 54*a* until one cycle of scanning over the supervisory region. More specifically, the circuit 57 carries out the counting until an output from the one-scan discriminating circuit 56*a* is obtained. When the number of the fire sources is one, an actuating signal 58 is output to the scanning circuit 51*b* of the second fire-source detecting apparatus 11*b*. When the number of the fire sources is two or more, a discrimination signal 59 is output. 60*a* is a register which temporarily stores a vertical scanning angle α and a horizontal scanning angle θ output from the vertical scanning angle detecting circuit 52*a* and the horizontal scanning angle detecting circuit 53*a*, respectively. This register 60*a* stores the vertical scanning angle α and the then horizontal scanning angle θ at a timing when the vertical scanning angle α is obtained.

The second fire source detecting apparatus 11*b* which is actuated when the two or more fire sources are discriminated by the fire source number discrimination control circuit 57 will be now be described. An output from the vertical scanning angle detecting circuit 52*b* is supplied to the monitoring area discriminating circuit 54*b* and it is discriminated whether the vertical scanning angle α signal at the time of fire source detection is within the monitoring area set by the monitoring area setting circuit 55 or not.

An output from the monitoring area discriminating circuit 54*b* is supplied to the one-scanning discriminating circuit 56*b*. The one-scanning discriminating circuit 56*b* monitors a timing when scanning data of one cycle of scanning from the actuation of the fire source detecting apparatus 11*b*, i.e., scanning data of one cycle of scanning through the entire supervisory region is obtained. 60*b* is a register which is input with outputs from the vertical scanning angle detecting circuit 2*b* and the horizontal scanning angle detecting circuit 53*b* and stores the vertical scanning angle α and the then horizontal scanning angle θ at a timing when the vertical scanning angle α signal, i.e., fire source detection signal is obtained.

A discrimination output from the one-scanning discriminating circuit 56*b* is supplied to the register 60*a* as a transfer-instructing signal through an OR gate 61 and further supplied directly to the register 60*b* and further supplied to a first fire source position calculating circuit 62*a* as a calculation actuating signal. The registers 60*a*, 60*b* output the vertical scanning angle α and the horizontal scanning angle θ stored therein to the first fire source position calculating circuit 62*a* in response to the discrimination output from the one-scanning discriminating circuit 56*b*. At the same time, the fire source position calculating circuit 62*a* receives the discrimination output from the one-scanning discriminating circuit 56*b* as the calculation actuating instruction, so that it carries out the calculation of the fire source position when the number of the fire sources is discriminated as one by the fire source number discrimination control circuit 57 on the basis of the transferred data from the registers 60*a*, 60*b*. The calculation of the fire source position by the first fire source position calculating circuit 62*a* is carried out in the form of the calculation of coordinates (X, Y) of the position based on the horizontal and vertical scanning angles θ1, α1 of the fire source position detected by the first fire source detecting apparatus 11a and the horizontal and vertical scanning angles θ2, α2 detected by the second fire source detecting apparatus 11*b*.

On the other hand, a discrimination output 59 from the fire source number discrimination control circuit 57 when the number of the fire sources are discriminated as two or more, is supplied to the register 60*a* through the OR gate 61 as a transfer-instructing signal and supplied also to the second fire source position calculating circuit 62*b* as a calculation actuating signal. Upon receipt of the discrimination output 59, the register 60*a* outputs the vertical scanning angle α and the horizontal scanning angle α stored therein to the second fire source position calculating circuit 62*b* so that the calculation of coordinates (X, Y) of the positions of the fire sources are carried out from the corresponding vertical scanning angles α and horizontal scanning angles θ, with respect to the plural fire source positions. In this connection, it is to be noted that registers 60*a*, 60*b* and the fire source position calculating circuits 62*a*, 62*b* are separately provided in the present embodiment, a single register and a single fire source position calculating circuit may be used in common.

Figure 9:
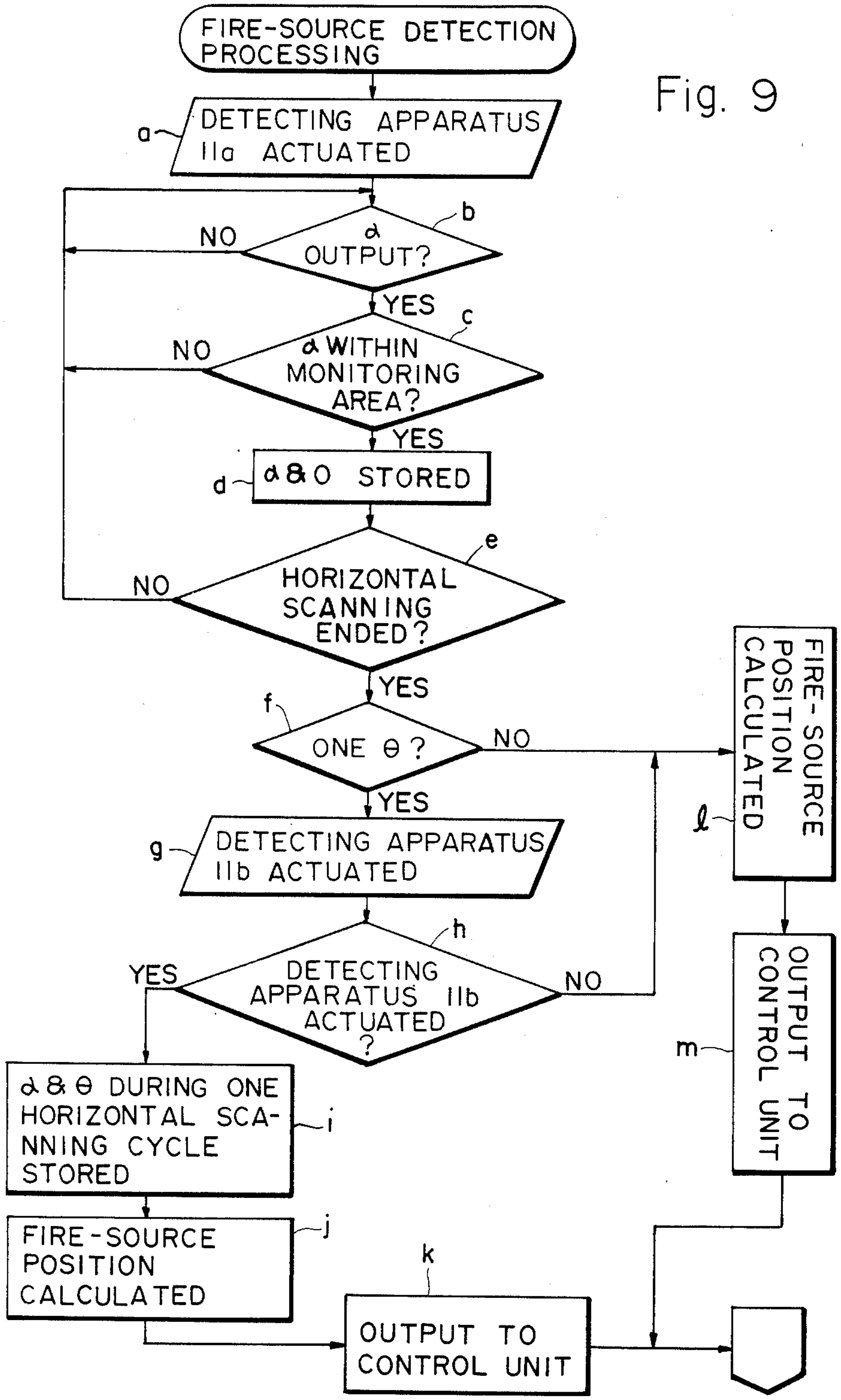
FIG. 9 is a flowchart showing a processing for the fire source detection according to the embodiment of FIG. 8.

The detection operation of the embodiment as illustrated in FIG. 8 will now be described referring to a flowchart of FIG. 9.

Figure 10:
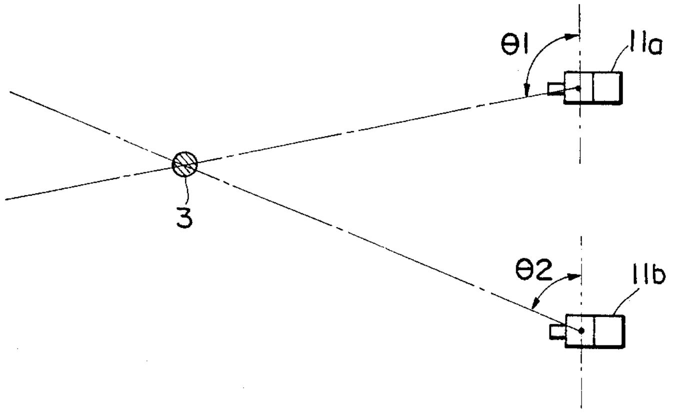
FIG. 10 is an explanatory view showing the fire source detection in the case there is one fire source.

First, the detection operation in the case a fire starts at one position within the monitoring area as illustrated in FIG. 10 will be described.

In normal monitoring, only the first fire source detecting apparatus 11*a* is actuated as indicated by block a. It is checked at decision block b whether there is a detection output of a vertical scanning angle α signal from the first fire source detecting apparatus 11*a* or not, i.e., whether a fire source detection signal is obtained or not. When a fire source is detected by the first fire source detecting apparatus 11*a*, the step proceeds to decision block c to compare the detection signal with the set data of the monitoring area setting circuit 55 by the monitoring area discriminating circuit 54*a*. If the detection signal is within the monitoring area, the step proceeds to block d to store the then vertical scanning angle α and horizontal scanning angle θ in the register 60*a*. The processing operations of decision block b to block d are repeated until one cycle of scanning through the entire supervisory region has been completed since the vertical scanning angle signal, i.e., the fire-source detection signal has been obtained. When one-scanning discrimination output is discriminated at decision block e by the one-scanning discriminating circuit 56*a*, the step proceeds to decision block f. At decision block f, it is decided as to whether the number (in this embodiment, the number of the vertical scanning angles α is counted) of the horizontal scanning angles θ obtained in one cycle of scanning is one or not. In this case, since a fire starts at one position as illustrated in FIG. 10, the step proceeds to block g to actuate the second fire source detecting apparatus 11*b*. The actuation of the second fire source detecting apparatus 11*b* is checked at decision block h and when the apparatus 11*b* is normally actuated, the step proceeds to block i. At block i, the vertical scanning angle α and the horizontal scanning angle θ in one cycle of horizontal scanning are stored in the register 60*b* by the processing operations of block b to block e. When the storage of α and θ at block i has been completed, the step proceeds to block j to read out the vertical scanning angle α and the horizontal scanning angle θ stored in the registers 60*a*, 60*b*, respectively and transfer the same to the first fire source position calculating circuit 62*a*. Then, coordinates (X, Y) of the position of a fire source 4 is calculated on the basis of the horizontal and vertical scanning angles θ1, α1 detected by the first fire source detecting apparatus 11a and the horizontal and vertical scanning angles θ2, α2 detected by the second fire source detecting apparatus 11b as illustrated in FIG. 10. After this calculation, positional data of the fire source is output to a control unit such as a monitor nozzle to control the direction of the monitor nozzle at block k.

Figure 11:
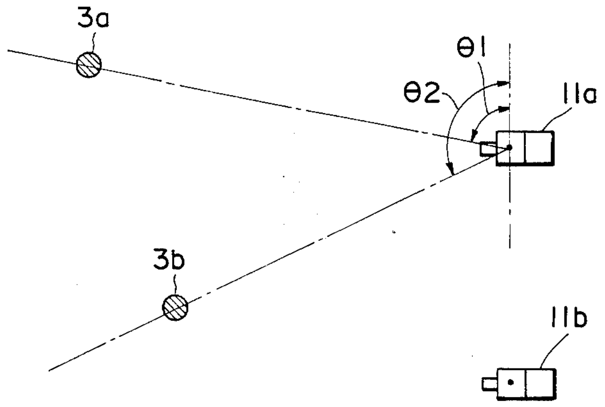
FIG. 11 is an explanatory view showing the fire source detection in the case there are two fire sources.

In the case where fires start at two positions within the monitoring area as illustrated in FIG. 11, since horizontal scanning angles θ1, α2 based on the detection of fire sources 3a, 3b have been obtained at block f on the basis of the detection data from the first fire source detecting apparatus 11a, the second fire source detecting apparatus 11b is not actuated. Then, the step proceeds to block 1 to calculate coordinates (X1, Y1) and (X2, Y2) of the position of the fire sources 4a, 4b from the vertical and horizontal scanning angles (α1, θ1) and (α2, θ2) stored in the register 60a. Thereafter, the calculation results are output to the control unit at block m to complete a series of processing operations.

In the fire source detecting operation as described above, when there is one fire source, the positional coordinates (X, Y) of the fire source 3 is calculated from the detection data from the two fire source detecting apparatuses 11a, 11b, i.e., horizontal scanning angles θ1, θ2 and vertical scanning angles α1, θ2. Therefore, if the fire source is positioned for example on a stage higher than the monitoring plane, accurate detection of the fire source position can be effected.

On the other hand, with respect to fires started at plural positions, the positions of the plural fire sources are calculated only from the detection data from the first fire source detecting apparatus 11a. Therefore, such a problem that the fire source position can not be specified due to generation of ghost images can be solved as opposed to the conventional matrix detection in which two fire source detecting apparatuses are used.

In this connection, it is to be noted that when fires start at plural positions, detection error is possibly caused at positions higher than the monitoring plane, but there is substantially no problem in practical use because the probability that fires start at plural positions at the same time is very small.

Figure 12:
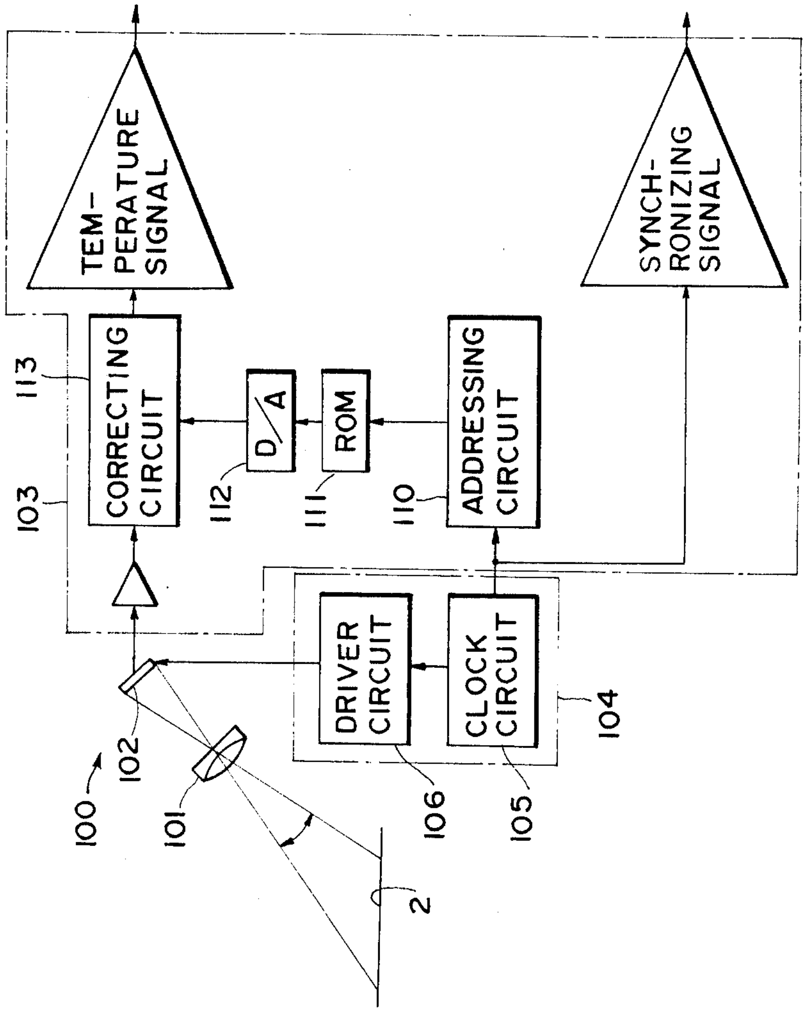
FIG. 12 is a block diagram of a fourth embodiment of the present invention.

A fourth embodiment of the present invention will now be described referring to FIGS. 12 and 13. In this embodiment, a CCD (charged coupled device) image sensor is used as a detecting element for detecting a fire source. A plurality of image sensors constitute a linear array.

A detecting head 100 comprises an optical system 101 for condensing heat radial energy from the detection range 2, a linear array 102 and a signal processing circuit 103 for processing an output signal from the linear array 102 to output to an arithmetic circuit (not shown). In FIG. 12, 104 designates a vertical scanning drive circuit which is comprised of a clock circuit 105 and a driver circuit 106.

The linear array 102 is a so-called CCD linear array which is a composite device wherein a great number of silicon photodiodes and a CCD shift register constituting a signal scanning section and it has a great number of picture elements. For example, a CCD linear array has a length of 30 mm and includes 2048 picture elements each having a size of 9 $\mu \times 14\mu$.

Figure 13:
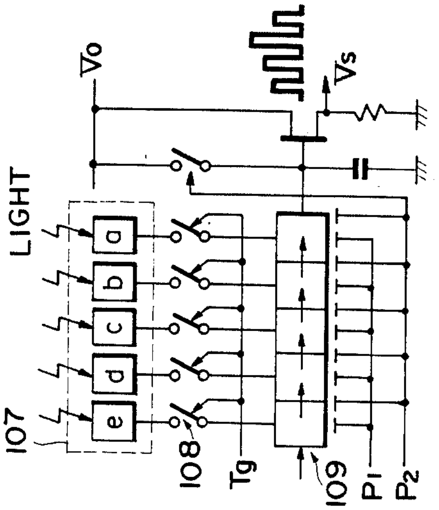
FIG. 13 is a block diagram of an arrangement of a CCD linear array used for a detecting head in the embodiment of FIG. 12.

FIG. 13 illustrates such a CCD linear array as a model in which the linear array 102 is shown in the form of a photodiode array 107 having a plurality of photodiodes a to arranged linearly and switches 108 and a CCD shift register 109 arranged so as to correspond to the photodiodes, respectively. The photodiode array 107 constitutes a photosensitive section and CCD shift register 109 constitutes a transfer section.

The base operation of the lineary array 102 will be described. Electric charge is stored in the photodiode array 107 by incident light. When the respective switches 108 are triggered by a trigger pulse, the electric charge stored in each of the photodiodes of the photodiode array 107 is transferred to the CCD shift register 109. The electric charge is sequentially transferred in the CCD shift register 109 by drive pulses P1, P2 and a time series output Vs as shown in obtained. During the transfer of the electric charge through the CCD shift register 109, electric charge is stored in the photodiode array 107 and similar operation is further repeated.

The signal processing circuit 103 is comprised of an addressing circuit 110, ROM 111, a D/A converter 112 and a correcting circuit 113. The correcting circuit 113 corrects fluctuation of dark level due to fluctuation of a dark current of CCD and variations in sensitivity among the picture elements or variations in sensitivity caused by a shading phenomenon in which energy is decreased at peripheral portions of an image at a time of image formation by a lens. The correcting circuit carries out such a correction processing in response to a clock from the clock circuit 105 for each address of the picture elements addressed by the addressing circuit 110 to generate a temperature signal.

More specifically, the radiant energy from the detection range 2 is condensed by the optical system 101 and irradiated onto the linear array 102. Each picture element of the linear array 102 has an extremely small field of vision and is scanned by the scanning pulses P1, P2 output from the driver circuit 106 based on the clock pulse output from the clock circuit 105. The scanning of the linear array 102 corresponds to the vertical scanning of the detection range 2.

Although not shown, the detecting head 100 of the present embodiment is also mounted on a horizontal scanning means such as a turning table as in the foregoing embodiments. An arithmetic unit used in the present embodiment is identical with those as used in the first or other embodiment. The circuits including the correcting circuit may be conventional ones.

We claim:

1. A scanning fire-monitoring system comprising:

fire source detecting apparatus including a detecting head having a limited field of vision and adapted to produce a fire detection signal upon detecting heat energy radiating from a monitoring area;

a vertical scanning means for driving the detecting head in the vertical direction over the monitoring area so as to scan a small width of such area;

horizontal scanning means on which said vertical scanning means and said detecting head are mounted and rotatable in the horizontal direction, whereby the detecting head is driven in the horizontal and vertical directions so as to cyclically scan the entire monitoring area; and an arithmetic unit connected to said detecting head and responsive to the fire detection signals produced thereby to calculate the positions of fire sources in the monitoring area.

2. A scanning fire-monitoring system as claimed in claim 1, wherein said detecting head comprises a detecting element sensitive to the heat radiant energy and an optical system for limitatively defining an impinging area of the heat radiant energy from the monitoring area on said detecting element so as to provide said small field of vision.

3. A scanning fire-monitoring system as claimed in claim 2, wherein said optical system comprises a stop means for providing said small field of vision.

4. A scanning fire-monitoring system as claimed in claim 3 wherein said optical system comprises a mirror which is driven for rotation in a vertical direction by said vertical scanning drive means.

5. A scanning fire-monitoring system as claimed in claim 4, wherein said mirror is double sided.

6. A scanning fire-monitoring system as claimed in claim 5, which further comprises a vertical position discriminating means for detecting a vertical scanning angle of said detecting head by said vertical scanning drive means and a horizontal position discriminating means for detecting a horizontal scanning angle of said detecting head by said horizontal scanning drive means, said airthmetic unit calculating the position of a fire source from the scanning angles detected by the vertical and horizontal position discriminating means.

7. A scanning fire-monitoring system as claimed in claim 6, wherein said arithmetic means calculates a distance interval between adjacent fire sources when a plurality of fire source positions are detected during one cycle of scanning over said monitoring area, and calculates the position of a fire source by regarding adjacent fire sources as being a single fire source when the calculated distance interval is smaller than a predetermined distance.

8. A scanning fire-monitoring system as claimed in claim 1, wherein said detecting head is a linear array of a plurality of image sensors each responsive to heat radiant energy within said small field of visiion and arranged to detect such energy over the entire monitoring area, such array being integrated with a scanning section and driven by said vertical scanning drive means so as to scan said plurality of elements sequentially.

9. A scanning fire-monitoring system as claimed in claim 8, wherein said image sensors are CCD image sensors.

10. A scanning fire-monitoring systems comprising:

fire source detecting apparatus including a detecting head having a limited field of vision and adapted to produce a fire detection signal upon detecting heat energy radiating from a monitoring area;

a vertical scanning means for driving the detecting head in the vertical direction over the monitoring area so as to scan a small width of such area;

horizontal scanning means on which said vertical scanning means and said detecting head are mounted and rotatable in the horizontal direction, whereby the detecting head is driven in the horizontal and vertical directions so as to cyclically scan the entire monitoring area; and an arithmetic unit connected to said detecting head and responsive to the fire detection signals therefrom to calculate the positions of fire sources in the monitoring area, such calculation including determining the distance interval between adjacent fire sources in such area and adjacent fire sources being treated as a single fire source when such distance interval is smaller than a predetermined distance;

said detecting head being a linear array of a plurality of CCD image sensors each responsive to heat radiant energy within said small field of vision to detect such energy over the entire monitoring area, such array being integrated with a scanning section driven by said vertical scanning drive means so as to scan said plurality of image sensors sequentially.

11. A scanning fire-monitoring system comprising two fire source detecting apparatuses each including a detecting head having a small field of vision and adapted to detect heat radiant energy from a monitoring area, a vertical scanning drive means for driving the detecting head to vertically scan a small width of the monitoring area, and a horizontal scanning drive means for mounting said detecting head and said vertical scanning drive means thereon and rotatable in a horizontal direction;

a fire source number discrimination control means which normally actuates only one of the fire source detecting apparatuses for scanning, determines the number of fire sources detected during one cycle of scanning over the entire monitoring area, and actuates the other of the fire source detecting apparatuses only when said number of fire sources is one;

a first fire source position calculating means for calculating the position of a fire source on the basis of scanning data produced by one cycle of scanning over the entire monitoring area by said other fire source detecting apparatus and by said one fire source detecting apparatus; and a second fire source position calculating means for calculating the positions of fire sources on the basis of horizontal and vertical scanning angles of the positions of the fire sources which have been already obtained by said one fire source detecting apparatus when the number of fire sources determined by said fire source number discrimination control means is two or more.

12. A scanning fire-monitoring system as claimed in claim 11, wherein said detecting head comprises a detecting element sensitive to the heat radiant energy and an optical system for limitatively defining an impinging area of the heat radiant energy from the monitoring area upon said detecting element so as to provide said small field of vision.

13. A scanning fire-monitoring system as claimed in claim 12, wherein said optical system comprises a stop means for providing said small field of vision.

14. A scanning fire-monitoring system as claimed in claim 13, wherein said optical system comprises a mirror which is driven for rotation in a vertical direction by said vertical scanning drive means.

15. A scanning fire-monitoring system as claimed in claim 14, wherein said mirror is double sided.

16. A scanning fire-monitoring system as claimed in claim 15, which further comprises a vertical position discriminating means for detecting the vertical scanning angle of said detecting head produced by said vertical scanning drive means and a horizontal position discriminating means for detecting the horizontal scanning angle of said detecting head produced by said horizontal scanning drive means, each of said fire source position calculating means determining the position of a fire source from the scanning angles detected by the vertical and horizontal position discriminating means.

17. A scanning fire-monitoring system as claimed in claim 11, wherein said detecting head is formed by a linear array of a plurality of CCD image sensors each responsive to heat radiant energy within said small field of vision and arranged to detect such energy over the entire monitoring area, such array being integrated with a scanning section driven by said vertical scanning drive means so as to scan said plurality of elements sequentially.

18. A scanning fire-monitiring system as claimed in claim 17, wherein said image sensors are CCD image sensors.

19. A scanning fire-monitoring system as claimed in claim 18, which further comprises a vertical position discriminating means for detecting the vertical scanning angle of said detecting head provided by said vertical scanning drive means and a horizontal position discriminating means for detecting the horizontal scanning angle of said detecting head produced by said horizontal scanning drive means, each of said fire source position calculating means determining the position of a fire source from the scanning angles detected by the vertical and horizontal position discriminating means.

* * * * *

UNITED STATES PATENT AND TRADEMARK OFFICE
CERTIFICATE OF CORRECTION

PATENT NO. : 4,749,862

DATED : June 7, 1988

INVENTOR(S) : YOSHIDA, ET AL

It is certified that error appears in the above—identified patent and that said Letters Patent is hereby corrected as shown below:

On the Title page, item [73] Assignee:

after the words Kabashiki Kaisha (but before the comma), add the words "Takenaka Komuten".

Signed and Sealed this

Thirtieth Day of September, 1997

Attest:

Bruce Lehman

BRUCE LEHMAN

*Attesting Officer*

*Commissioner of Patents and Trademarks*